United States Patent
Nagaishi

(10) Patent No.: US 6,244,068 B1
(45) Date of Patent: *Jun. 12, 2001

(54) COOLANT CONTAINER AND ITS METHOD OF MANUFACTURE

(75) Inventor: Tatsuoki Nagaishi, Osaka (JP)

(73) Assignee: Sumitomo Electric Industries, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/444,313

(22) Filed: Nov. 22, 1999

(30) Foreign Application Priority Data

Nov. 27, 1998 (JP) ................................. 10-337892

(51) Int. Cl.[7] ..................................... F25D 3/08
(52) U.S. Cl. ............................. 62/530; 62/45.1
(58) Field of Search .................... 62/45.1, 51.1, 62/530

(56) References Cited

U.S. PATENT DOCUMENTS

| | | | |
|---|---|---|---|
| 4,510,758 | * | 4/1985 | Tench ........................ 62/45 |
| 4,606,195 | * | 8/1986 | Winkler ...................... 65/45 |
| 4,713,941 | * | 12/1987 | Toyoda et al. .............. 62/50 |
| 4,821,907 | * | 4/1989 | Castles et al. ............. 62/45 X |
| 5,408,832 | * | 4/1995 | Boffito et al. ............. 62/51.1 X |
| 5,613,367 | | 3/1997 | Chen ........................ 62/47.1 |

FOREIGN PATENT DOCUMENTS

| | | |
|---|---|---|
| 161362 | 5/1902 | (DE) . |
| 1294995 | 11/1972 | (GB) . |
| 57-195998 | 12/1982 | (JP) . |
| 58121399 | 9/1983 | (JP) . |
| 61201994 | 9/1986 | (JP) . |

* cited by examiner

Primary Examiner—William Doerrler
Assistant Examiner—Chen Wen Jiang
(74) Attorney, Agent, or Firm—Foley & Lardner

(57) ABSTRACT

The present invention provides a low cost coolant container that is easy to produce without decreasing its ability to maintain a coolant.

The coolant container 1 comprises an outer container 11 and an inner container 12 wherein the cylindrical members 111 and 121 and the plate members 112 and 122 of the outer container 11 and the inner container 12 are engaged at the peripheral end such that even if an external force acts on the flat surface of the plate members 112 and 122 the stopping means 111a and 121a of the engaging portions A and B prevent the plate members 112 and 122 from sinking toward the hollow portion 13 side by supporting the plate members 112 and 122 and resisting the external force and as a result the container has the required structural strength and its ability to maintain a coolant is preserved. Moreover, because cylindrical members 111 and 121 and plate members 112 and 122 with simple shapes are used, it is not necessary to strengthen them by screwing the plate members 112 and 122 into the cylindrical members 111 and 121, and these material and processing costs can be avoided and a low cost product can be provided.

10 Claims, 4 Drawing Sheets

COOLANT CONTAINER AND ITS METHOD OF MANUFACTURE

BACKGROUND OF THE INVENTION (i) Field of the Invention

The present invention relates to a vacuum adiabatic type coolant container for holding low temperature coolants such as liquid nitrogen, liquid helium, or liquid hydrogen.

(ii) Description of Related Art

Japanese Patent Laid-Open Publication No. 57-195998 describes a conventional coolant container made of fiber reinforced plastics (hereinafter referred to as "FRP"). According to this document, the coolant container is made by joining together the cylinder which forms the inner surface of the container and the panel which forms the bottom surface. It also suggests the possibility of forming these as a single unit.

FIG. 4 is a cross section of an example of a conventional coolant container wherein the inner container comprising a cylinder and a panel are built inside the outer container formed as a single unit. A coolant container 30 in a substantially cylindrical shape is comprised of a cup-shaped, single-unit outer container 31 and an inner container 32 placed inside the outer container 31. The inner container 32 is comprised of a panel 322 in a simple disk shape that engages with the lower end of a round cylinder 321 (the lower end as shown in FIG. 4; hereinafter "lower" and "upper" are used in relation to the figures). There is a flange on the upper end of the inner container 32 which fits the open end of the outer container 31, and the space enclosed by the outer container 31 and the inner container 32 is maintained with a vacuum and forms a vacuum adiabatic portion 13.

When a coolant 6 is held inside the inner container 32 of coolant container 30 constructed in this way, evaporation of the coolant 6 is restricted by the adiabatic effect of the vacuum adiabatic portion 13, and as a result the coolant 6 can be maintained for a long period of time.

FIG. 5 is a cross section of an example of another conventional coolant container and shows the construction of the container disclosed in the above Laid-Open Patent. This coolant container 40 comprises a cylinder 321 in a simple, rounded-edge, cylindrical shape engaged with the inner surface of the upper end of a panel 402 formed in the shape of a short cup and bonded together.

However, the following problems arise with the conventional coolant container 30.

1) When external pressure such as or approximately the same pressure with an atmospheric pressure acts on the upper surface of the panel 322 and the inner surface of the cylinder 321 of the inner container 32 shown in FIG. 4 from toward the bottom), there is a danger that with the engagement configuration of the inner container 32 the panel 322 will sink down against the lower side of the vacuum adiabatic portion 13 and the coolant maintenance capability of the container will decline. If the vacuum is broken in this way, the adiabatic capability of the vacuum adiabatic portion 13 will be lost and the coolant can easily evaporate due to heat transfer from the outside. It is therefore necessary to reinforce the container by processing a internal thread on the inner periphery of the lower end of the round cylinder 321 and a external thread that fits the internal thread on the panel 322, and fitting the external thread into the internal thread to prevent the panel 322 from sinking down. The same reinforcement as the inner container 32 will be necessary for the outer container 31 if it, like the inner container 32, is cylindrical shape with an open lower end closed off with a disk-shaped panel, because external pressure such as approximately the same pressure with atmospheric pressure will act from below on this panel. Construction of the screw and nut is troublesome and because it is necessary to increase the thickness of the panel 322 in order to obtain a designated screw-mesh force, the cost of materials mounts.

Even when the inner container 40 of the engagement configuration shown in FIG. 5 is used as the inner container 32 in the coolant container 30, the danger that the panel 402 will sink down toward the vacuum adiabatic portion 13 side of the lower end and the capability of the container to maintain the coolant will decline cannot be ruled out.

2) If the cup-shaped outer container 31 as shown in FIG. 4 is made of FRP for example, a mold is produced and the FRP layers are layered by hand one at a time on top of the mold while coating with a matrix resin to form a single-unit container (hand lay-up method). However, this manufacturing method is time-consuming and manufacturing costs are high. A method in which the FRP and resin are sprayed together onto the mold (spray-up method) can be applied, but again the manufacturing costs are high and there are limits to the shape of the mold.

SUMMARY OF THE INVENTION

The purpose of the present invention, considering the above problems, is to provide a low cost coolant container that is easily produced but has the required structural strength, without decreasing the capability of the container to maintain the coolant and a manufacturing method of the coolant container making production easy with a shortened production period and low production costs.

In order to solve the above problems, the coolant container of the present invention is constructed such that a hollow portion is formed by placing a substantially cylindrical inner container with one end closed up inside a substantially cylindrical outer container with one end closed up and joining both containers at the other end with coolant held inside the inner container, wherein either the outer container or the inner container or both has a cylindrical member and a plate member which engage at the peripheral end of the closed up end of the containers and the engaging portion of the peripheral end is formed either continuously or intermittedly around the periphery, and the structure includes a stopping means for stopping and supporting the peripheral ends of the plate members by resisting external force acting on the flat surface of the plate members.

With a coolant container constructed in this way, the plate member and the cylindrical member of either the outer container or the inner container or both engage at the peripheral end and if an external force such as a pushing force acts on the flat surface of the plate member the forces will be balance when a counteracting force of the same size as the external force and in the opposite direction works on the peripheral end of the plate member supported by the stopping means at the engaging portion resisting the external force. As a result, even if the container is not reinforced by fixing the plate member to the cylindrical member with a screw, the plate member can be prevented from sinking toward the hollow portion side between the outer container and the inner container. Also, because the cylindrical member and the plate member engage at a designated location on the peripheral end, when the container is assembled by engaging the plate member and the cylindrical member, the plate member will not slip in a planar direction and the container can be assembled while precisely positioning the plate member.
}

Further, if the above hollow portion is maintained in a vacuum and made a vacuum adiabatic portion, evaporation of the coolant held in the inner container can be restricted by the adiabatic effect of this vacuum adiabatic portion. At this time, an external pressure (substantially the same pressure with an atmospheric pressure) corresponding to the difference in atmospheric pressure in the inside and the outside of the vacuum adiabatic portion acts toward the vacuum adiabatic portion on the outer surface of the outer container and the inner surface of the inner container which form the boundaries of the vacuum adiabatic portion. The plate members of the inner container and the outer container upon which this pressure acts are prevented from sinking toward the vacuum adiabatic portion by the balancing of forces at the peripheral end due to the function of the stopping means described above.

An adsorption member containing activated carbon fibers for maintaining adsorption of the gaseous components within the vacuum adiabatic portion can also be placed in contact with the side of the vacuum adiabatic portion in the inner container.

By doing so, adsorption of the gaseous components within the vacuum adiabatic portion is maintained by this adsorption member and the degree of vacuum inside the vacuum adiabatic portion is heightened and any deterioration of the degree of vacuum is prevented. Further, because the surface area for adsorption of gases of activated carbon fibers is large compared to powdered or granular activated carbon, adsorption capabilities are further increased and the degree of vacuum of the vacuum adiabatic portion is further heightened. Also, because activated carbon fibers generate only a small amount of coal dust, they are not harmful to the environment.

As for the construction of the coolant container, fiber reinforced plastic (FRP) for example can be used as the material of the inner container and the outer container, a flange is constructed extending around the entire periphery of the other end of the inner container, the flange is supported on the other end of the outer container, and the supporting portion is sealed.

By constructing the container in this way, the amount of heat from the coolant that is transferred through the inner container and lost to the outside can be restricted because FRP has an extremely small heat-transfer rate. Also, because FRP is nonmagnetic, it does not have an adverse magnetic effect if magnetic instrumentation is performed by, for example, installing a magnetic sensor in the coolant container.

The manufacturing method of the coolant container of the present invention constructed such that a hollow portion is formed by placing a cylindrical inner container with one end closed up inside a cylindrical outer container with one end closed up and joining both containers at the other end, maintaining the hollow portion with a vacuum, and holding coolant inside the inner container, comprises a first process for forming a continuous or intermitted peripheral stopping means, which is an engaging portion wherein the peripheral end of one end of a cylindrical member and the peripheral end of a plate member engage having shaved in a designated location either the cylindrical member or the plate member or both having designated dimensions and thicknesses, for stopping and supporting the peripheral end of the plate member by resisting the external force acting on the flat surface of the plate member and a second process performed on either the inner container or the outer container or both of sealing the engaging portion where the cylindrical member and the plate members engage, wherein the two processes are performed in that order.

With this manufacturing method, either the outer container or the inner container or both can easily be obtained by engaging at the engaging portions formed by the process of shaving either the cylindrical member or the plate member or both. As the stopping means for supporting the plate member by resisting the external force acting on the plate member is built into this engaging portion, the plate member can be prevented without forming the container as a single unit and without reinforcing the container by fixing the plate member to the cylindrical member with a screw from sinking toward the hollow portion side (the vacuum adiabatic portion side). Also, because simple cylindrical members and plate members are used, the pre-processed materials can be supplied at low cost and the engaging portion can be formed by shaving off either the cylindrical members or the plate members or both with a general-purpose equipment. Further, such a manufacturing method is simple compared to forming complicated shapes with troublesome manufacturing methods such as hand lay-up or spray-up using resins such as FRP.

It is more preferable that the manufacturing method also comprises a third process for forming an adsorption member containing activated carbon fibers in a shape such that it can be attached to the outer surface of the inner container and placing the adsorption member inside the hollow portion in contact with the outer surface of the inner container.

If such a process is added, it is easy to put the adsorption member in contact with the flat surface of the side of the hollow portion (the side of the vacuum adiabatic portion) of the inner container because the activated carbon fibers used to construct the adsorption member are flexible and the gas adsorption capabilities of the adsorption member improve when it is cooled effectively by the coolant. Also, because the activated carbon fibers are easy to cut, it is easy to form the adsorption member into a shape that can easily adhere to the outer flat surface of the inner container. When the adhesion improves, the adsorption member is cooled still more effectively, gas adsorption improves further, and the degree of vacuum in the vacuum adiabatic portion increases.

DETAILED DESCRIPTION OF THE PREFERRED EMBODIMENT

In the following, the preferred embodiments of the present invention are described with reference to the attached drawings. The same marks are used for the same elements across the drawings, and repetitive descriptions are omitted.

Figure 1:
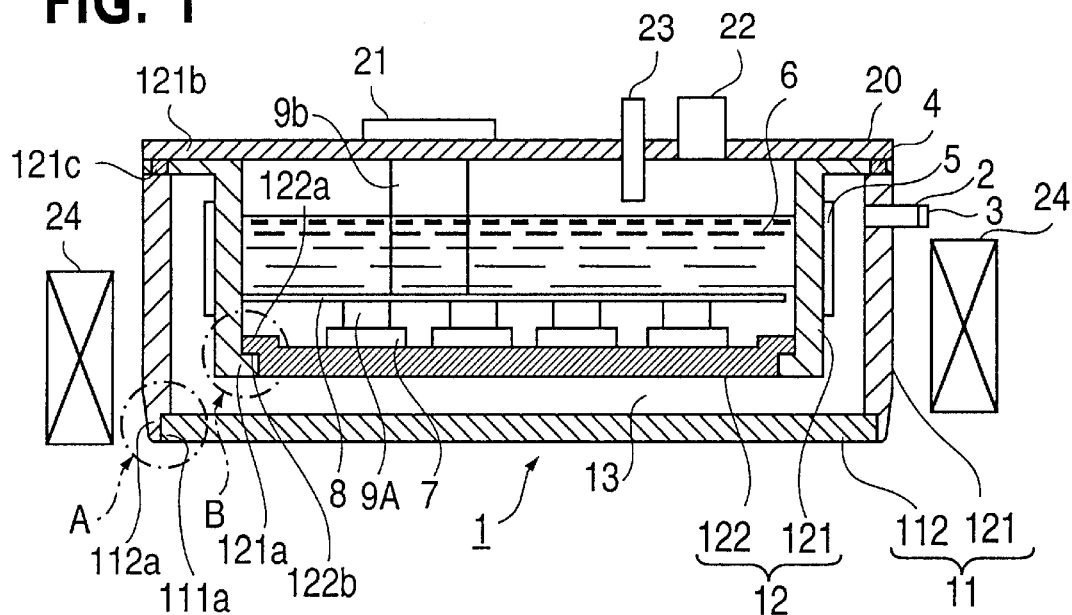
FIG. 1 is a cross-section showing one embodiment of the present invention.
Figure 2:
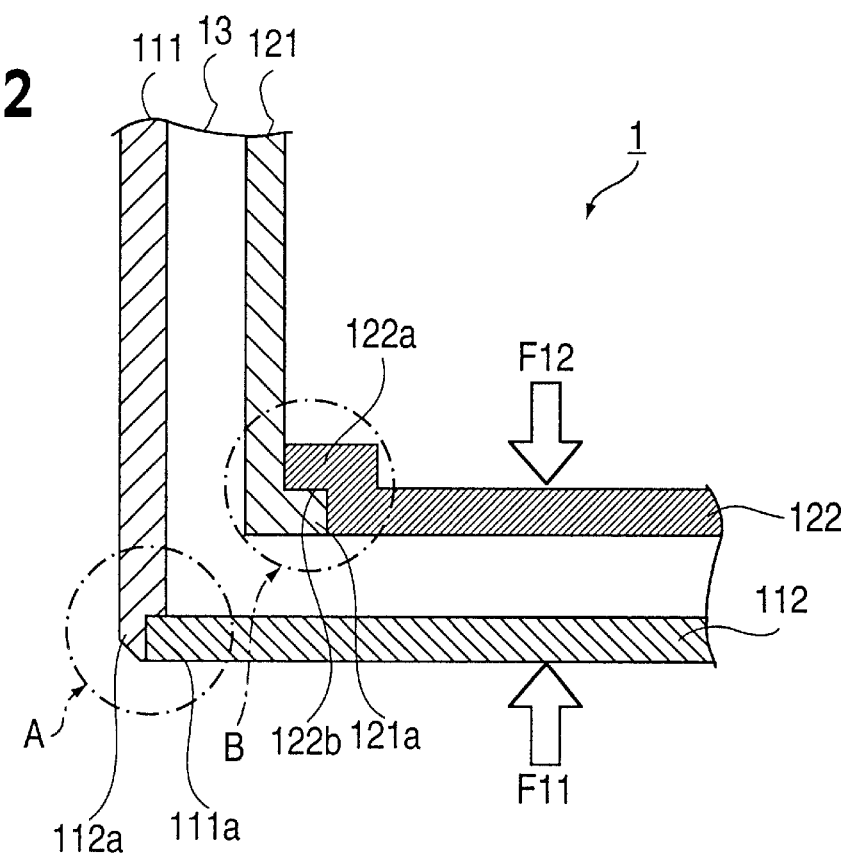
FIG. 2 is an enlarged cross-section showing the engaging portion of the cylindrical members and the plate members of one embodiment of the present invention.

FIG. 1 is a cross-section showing one embodiment of the present invention. FIG. 2 is an enlarged cross-section showing the engaging portion of the cylindrical member and the plate member of one embodiment of the present invention. As shown in FIG. 1, in the coolant container 1 in this embodiment, a cup-shaped inner container 12 is set inside a cup-shaped outer container 11 and the open end of this outer container 11 is joined to a flange 121b on the open end of the inner container 12 via a sealing means such as an O-ring 4. Gases inside the hollow portion, which is sealed off airtight between the outer container 11 and the inner container 12, are exhausted through an exhaust hole 2 passing through the side of the outer container 11. When the portion becomes a vacuum, one end of the exhaust hole 2 is plugged up with a cap 3 such as a O-ring used as a plugging means, and the hollow portion becomes a vacuum adiabatic portion 13. Due to the adiabatic effect of the vacuum adiabatic portion 13, heat transfer from outside the coolant container 1 is restricted and as a result the coolant 6 held inside the inner container 12 does not evaporate easily and can be maintained over a long period of time.

Here, a disk-shaped plate member 112 engages with the bottom end of the cylindrical member 111 of the outer container 11. As shown in FIGS. 1 and 2, a ring-shaped groove 111a is formed continuously around the periphery of the inner surface of the lower end of the cylindrical member 111. The peripheral end 112a of the disk-shaped plate member 112 engages with this ring-shaped groove 111a and they are connected. Because the vacuum adiabatic portion 13 is maintained by an ordinary vacuum, an external force F11 of substantially the same pressure with an atmospheric pressure acts on the flat surface of the plate member 112 from below (see FIG. 2). This external force F11 acts on the ring-shaped groove 111a that forms one end of the engaging portion A via the peripheral end 112a that forms the other part of the engaging portion A and a counteracting force to external force F11 acts in the opposite direction to F11 on this peripheral end 112a. The balancing of the force F11 and the counteracting force prevents the plate member 112 from sinking toward the vacuum adiabatic portion 13 side. In other words, the ring-shaped groove 111a that forms the engaging portion A functions as a stopping means supporting the plate member 112a by resisting the external force F11.

For the inner container 12, a disk-shaped plate member 122 engages with the lower end of the cylindrical member 121. In this engaging portion B, a flange 121a protrudes continuously around the periphery of the inner surface of the lower end of the cylindrical member 121 and a ring-shaped concavity 122b is formed on the peripheral end 122a of the plate member 122. The flange 121a of the cylindrical member 121 engages with this ring-shaped concavity 122b and they are joined. Because the vacuum adiabatic portion is maintained by an ordinary vacuum, an external force F12, which is the weight of the coolant 6 and substantially the same pressure with an atmospheric pressure, acts from above (see FIG. 2) on the flat surface of the plate member 122. The external force F12 acts on the flange 121a that composes one end of the engaging portion B formed on the peripheral end 122a via the ring-shaped concavity 122b that composes the other end of the engaging portion B. A counteracting force to the external force F12 in the opposite direction of F12 then acts on the peripheral end 122a. The balancing of the force F12 and the counteracting force prevent the plate member 122 from sinking toward the vacuum adiabatic portion 13 side. In other words, the flange 121a that is a component of the engaging portion B functions as a stopping means for supporting the plate member 122 by resisting the external force F12.

In this way, in the coolant container 1 of the present embodiment, the cylindrical member 111 and the plate member 112 that compose the external container 11 are engaged by the ring-shaped groove 111a and the peripheral end 112a to compose the engaging portion A. Even if an external force F11 of substantially the same pressure with an atmospheric pressure acts from below on the flat surface of the plate member 112, the ring-shaped groove 111a acts as a stopping means to resist the external force F11, support the plate member 112, and prevent the plate member 112 from sinking into the vacuum adiabatic portion 13. The cylindrical member 121 and the plate member 122 that form the inner container 12 are engaged by the flange 121a and the ring-shaped concavity 122b formed on the peripheral end 122a of the plate member 122 that compose the engaging portion B. Even if an external force F12 of substantially the same pressure with an atmospheric pressure, etc. acts from above on the flat surface of the plate member 122, the flange 121a acts as a stopping means to resist the external force F12, support the plate member 122, and prevent the plate member 122 from sinking into the vacuum adiabatic portion 13. Due to the functions of the above stopping means 111a and 121a, the container has the necessary structural strength and can therefore maintain the coolant 6. Also, because the vacuum of the vacuum adiabatic portion 13 is not broken, it is possible to improve the container's ability to maintain the coolant 6 by continuing to restrict evaporation of the coolant 6. Furthermore, because simple shapes for cylindrical members 111 and 121 and plate members 112 and 122 are used and because it is not necessary to reinforce the plate members 112 and 122 with screws in cylindrical members 111 and 121, the costs of materials and processing are decreased. In addition, because the plate members 111 and 121 are precisely positioned when assembled by the engaging portions A and B, manufacturing the container is easy.

Figure 5:
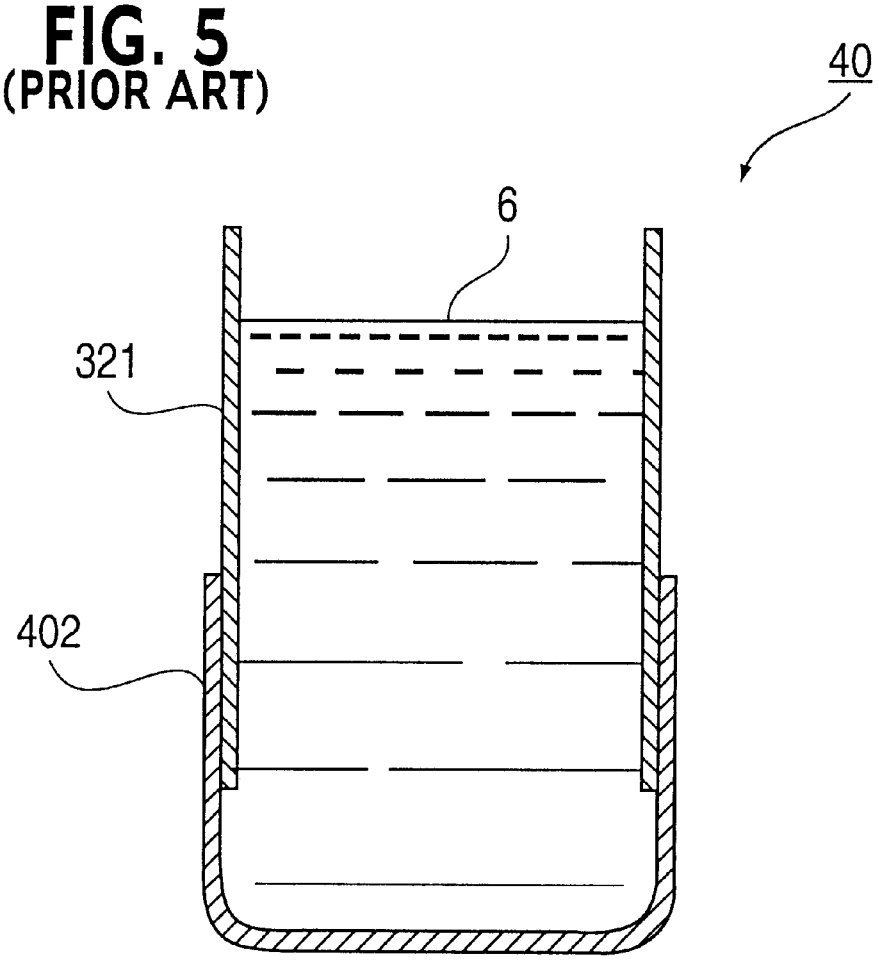
FIG. 5 is a cross-section showing one example of another conventional coolant container.

In the engaging connection between the cylinder 321 and the panel 402 of the conventional example shown in FIG. 5, the coefficient of thermal expansion in the axial direction of both should be approximately equivalent in order to prevent the generation of cracks or adhesive stripping at the connection due to thermal stress when the coolant 6 is poured in. As a result, the types of materials that can be used are limited. Because the inner container in the present embodiment can be constructed without such limitations, there is a greater degree of freedom in design and materials costs are reduced.

However, it is extremely difficult to create a perfect vacuum in the vacuum adiabatic portion only by exhausting gas as described above because a minute amount of gas components may remain inside the vacuum adiabatic portion and become heat-transfer material. Thus, in the present embodiment, in order to improve the capabilities of maintaining the coolant 6 still more by further raising the degree of vacuum within the vacuum adiabatic portion 13, an adsorption member 5 comprising felt-type non-woven cloth containing activated carbon fibers is attached inside the vacuum adiabatic portion 13 such that it is in contact with the outer surface of the inner container 12 as shown in FIG. 1. The outer surface of the adsorption member 5 is covered with an adiabatic film (not shown in the figure) composed of a thin polymer film with aluminum vapor deposited on the surface (generally called superinsulation).

At this time, the activated carbon of the adsorption member 5 contacting the inner container 12 side of the vacuum adiabatic portion 13 is cooled by the coolant 6 held inside the inner container 12. Gas molecules remaining inside the vacuum adiabatic portion 13 repeatedly collide with the surface of the cooled activated carbon and gradually the kinetic energy of the gas molecules is absorbed. When the kinetic energy of the gas molecules eventually becomes smaller than the potential energy of the activated carbon adsorbing the gas particles, the gas molecules are adsorbed and held, caught in the activated carbon. As a result, the pressure inside the vacuum adiabatic portion 13 decreases and the degree of vacuum increases.

This is a general effect of activated carbon, but in the present embodiment adsorption member 5 is made of non-woven cloth comprising activated carbon fibers rather than powdered or granular activated carbon, the non-woven cloth is greatly flexible, and the adsorption member 5 can easily be placed in contact with the surface of the side of the vacuum adiabatic portion 13 of the inner container 12. Therefore heat-transfer between the adsorption member 5 and the coolant 6 through the inner container 12 is very good and by cooling the adsorption member 5 sufficiently, its ability to adsorb gas increases. As the degree of vacuum inside the vacuum adiabatic portion 13 increases and prevents a decline in the degree of vacuum, it is possible to further increase the ability of the container to maintain the coolant 6. Moreover, because the surface area for adsorbing gas is larger when using activated carbon fibers in comparison with powdered or granular activated carbon, and because the degree of vacuum inside the vacuum adiabatic portion 13 further increases by increasing the gas adsorption, the ability of the container to maintain the coolant 6 can be improved still more. In addition, activated carbon fibers generate only a small amount of coal dust, so there is less worry of polluting the environment with coal dust when exhausting the vacuum adiabatic portion 13. Further, when the adsorption member 5 is covered with an adiabatic film and cooled still more the degree of vacuum inside the vacuum adiabatic portion 13 increases still further and the ability to maintain the coolant 6 is further increased.

Next the inventors have confirmed that the above effect can be obtained with the following experiment. As shown in FIG. 1, the inside of the inner container 12 of container 1 was filled with liquid nitrogen as the coolant 6 and a high temperature superconducting magnetic sensor 7 with a critical temperature higher than the temperature of the liquid nitrogen was immersed in the coolant 6 via a wiring means 9a below a supporting means 8. This high temperature superconducting magnetic sensor 7 was placed such that it was in contact with the top of the plate member 122 of the inner container 12. A wiring means 9b was placed on the upper surface of the supporting means 8. These wiring means 9a and 9b were watertight. Power cables and signal cables (not shown in the figure) were connected to the high temperature superconducting magnetic sensor 7 passing through the wiring means 9a and 9b, and were then connected to a junction means 21 passing through a container lid 20 that covered and closed off the inner container 12. A power and signal processing means not shown in the figure was connected to this junction means 21. A coolant exhaust hole 22 for allowing the coolant 6 that gradually gasifies inside the container to escape outside was built into the container lid 20 and a coolant supply hole 23 for supplying coolant in the case that the coolant was insufficient was also built through the lid 20. The inner container 12 and the outer container 11 of the coolant container 1 were made of a FRP, which is nonmagnetic and whose heat-transfer rate is lower than that of metal.

Figure 4:
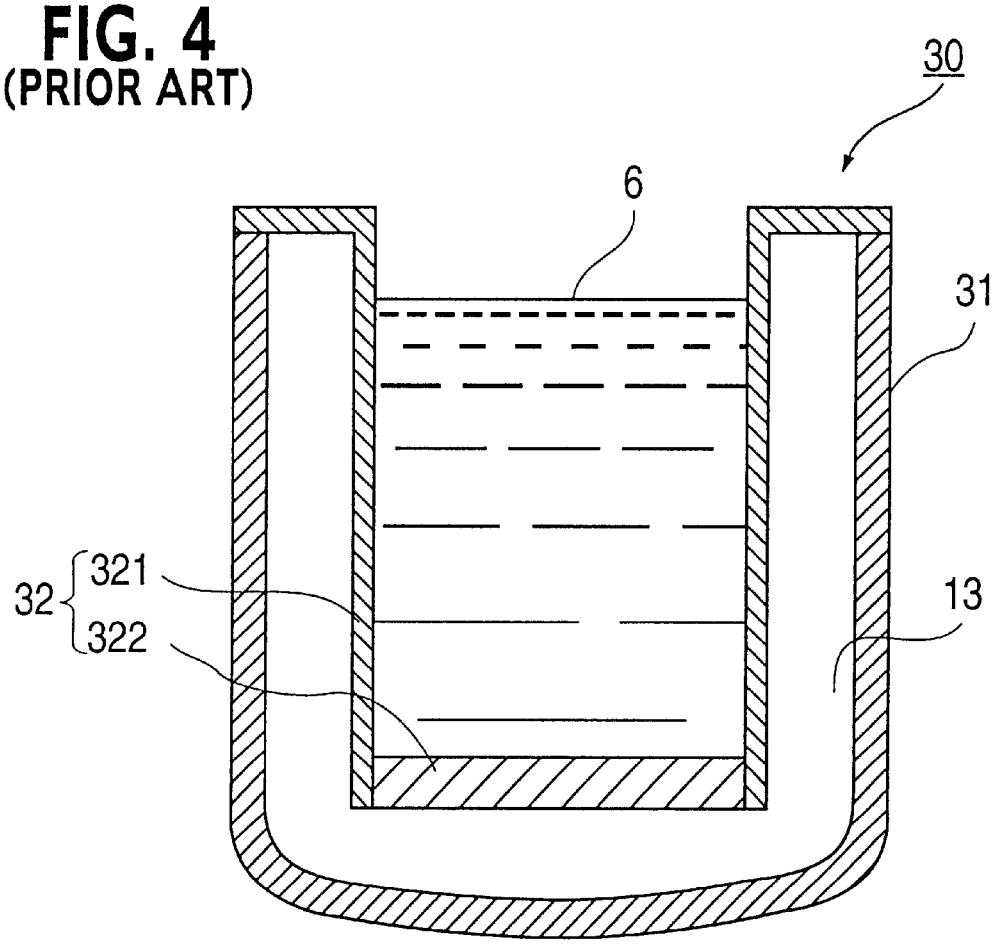
FIG. 4 is a cross-section showing one example of a conventional coolant container.

Under these conditions, an alternating-current magnetic field was applied to the high temperature superconducting magnetic sensor 7 from outside the coolant container 1 with a magnetic field application means 24 placed outside the coolant container 1. When we had operated and examined the high temperature superconducting magnetic sensor 7, we were able to obtain a stabilized output signal and confirmed that the coolant 6 was maintained for a longer period of time than when the conventional coolant container 30 shown in FIG. 4 was used. In other words, as mentioned above, because the structure prevented the plate members 112 and 122 from sinking toward the vacuum adiabatic portion 13 and preserved the ability of the container to maintain the coolant 6, the high temperature superconducting magnetic sensor 7 was cooled well and a stabilized signal was obtained. Further, because the structure of the container causes the degree of vacuum of the vacuum adiabatic portion 13 to rise and prevents any deterioration of the degree of vacuum via the adsorption member 5 containing activated carbon fibers, the coolant 6 is maintained for a still longer period of time.

Also, because the inner container 12 and the outer container 11 that compose the coolant container 1 are made of FRP, which has a small heat-transfer rate, the scattering and dispersal of the heat of coolant 6 to the outside transferred through the inner container 12 and the outer container 11 can be restricted and the ability of the container to maintain the coolant 6 improves. Because FRP is nonmagnetic, there is no adverse magnetic effect during magnetic instrumentation caused by the high temperature superconducting magnetic sensor 7. Therefore it is possible to perform precise magnetic instrumentation.

If the test object is placed below the plate member 112 of the outer container 11 shown in FIG. 1 and magnetic instrumentation of the test object is performed with the high temperature superconducting magnetic sensor 7, because the high temperature superconducting magnetic sensor 7 is in contact with the upper surface of the plate member 122 of the inner container 12, the space between the test object and the high temperature superconducting sensor 7 can be minimized and the instrumentation sensitivity to the test object is raised.

Next, one manufacturing method of the coolant container 1 constructed as shown in FIGS. 1 and 2 is explained.

(1) Glass fibers are coated with epoxy resin while wound around a cylindrical body and hardened to obtain a preform for processing the cylindrical members 111 and 121 to the desired cylindrical shape. Using this same material, a preform is obtained for processing the plate members 112 and 122 to the desired plate shape.

(2) The inner surface of one end of the cylindrical member 111 that forms the outer container 11 is shaved continuously around the periphery with the above preform for processing to create the ring-shaped groove 111a to be used as a stopping means that forms one end of the engaging portion A shown in FIG. 2. A hole is drilled in the cylinder surface of the cylindrical member 111 for connection to the cylindrical exhaust hole 2 and is connected to the exhaust hole 2. The inner surface of one end of the cylindrical member 121 that forms the inner container 12 is shaved continuously around the periphery with the above preform for processing to create a flange 121a to be used as a stopping means that forms one end of the engaging portion B shown in FIG. 2. A ring-shaped groove 121c is created on the lower surface of the flange 121b built on the other end to obtain the inner container 12 (see FIG. 1).

(3) The peripheral end 122a of the plate member 122 of the inner container 12 is shaved with the above preform for processing to form a ring-shaped concavity 122b that forms the other end of the engaging portion B shown in FIG. 2. It is not necessary to shave the plate member 112 of the outer container 11 with the above member for processing; the member for processing can be used as the plate member 112.

(4) The ring-shaped groove 111a of the cylindrical member 111 is coated with an epoxy resin type adhesive and the outer container 11 is obtained by engaging the plate member 112 and the cylindrical member 111 at the engaging portion A which is constructed of the peripheral end 112a and this ring-shaped groove 111a. The flange 121a of the cylindrical member 121 is coated with an epoxy resin type adhesive and the inner container 12 is obtained by engaging the plate member 122 and the cylindrical member 121 at the engaging portion B which is constructed of the ring-shaped concavity 122b and this flange 121a. In this way the outer container 11 and the inner container 12 are assembled with precision and ease by engaging the above parts.

(5) The adsorption member 5 is obtained by cutting a non-woven felt sheet having the desired thickness and made of activated carbon fibers into a shape that is easily attached to the outer surface of the cylindrical member 121 of the inner container 12. Next, the adsorption member 5 is attached to the outer surface of the cylindrical member 121 of the inner container 12. Then multiple layers of superinsulation (adiabatic film) are wound around the outer surface of the adsorption member 5 so that they cover it. An O-ring 4 is placed in the ring-shaped groove 121c processed in the flange 121b on the other end of the inner container 12 as a sealing means. The inner container 12 is inserted inside of the outer container 11 and the flange 121b of the inner container 12 is supported by the open end of the cylindrical member 111 of the outer container 11. At this time the O-ring 4 on the flange 121b is compressed by the open end of the cylindrical member 111, collapses inside the ring-shaped groove 121c, and the connection between the outer container 11 and the inner container 12 is sealed to create the coolant container 1.

(6) Using an exhaust means not shown in the figures, the gas inside the hollow portion 13 sealed off between the outer container 11 and the inner container 12 is exhausted and a vacuum is created. Then the exhaust hole 2 is plugged with the lid 3 having a O-ring as a plugging means and the vacuum adiabatic portion 13 is formed.

With such a manufacturing method of the coolant container 1 of the present embodiment, it is easy to engage the plate member 112 and the cylindrical member 111 of the outer cylindrical member 11 with the engaging portion A composed of the peripheral end 112a of the plate member 112 and the ring-shaped groove 111a shaved in the cylindrical member 111 of the outer container 11, and the ring-shaped groove 111a in the engaging portion A acts as a stopping means and prevents the plate member 112 from sinking toward the vacuum adiabatic portion 13 (the hollow portion). It is also easy to engage the plate member 122 and the cylindrical member 121 of the inner container 12 with the engaging portion B composed of the ring-shaped concavity 122b on the peripheral end 122a of the plate member 122 and the flange 121a shaved in the cylindrical member 121 of the inner container 12, and the flange 121a in the engaging portion B acts as a stopping means and prevents the plate member 122 from sinking toward the vacuum adiabatic portion 13 (the hollow portion). Thus, the outer container 11 and the inner container 12 are obtained easily and the production costs can be reduced because the processes for strengthening the containers by making screws on the cylindrical members 111 and 112 and the plate members 112 and 122 and screwing the plate members 112 and 122 into the cylindrical members 111 and 121 can be omitted and the total number of processes reduced. Also, materials costs as well as production costs can be further reduced because cylindrical members 111 and 121 and plate members 112 and 122 with simple shapes made of materials supplied cheaply are used, the cylindrical members 111 and 121 and the plate member 122 are shaved with a general-purpose equipment, and plate member 112 is not processed. Further, this kind of manufacturing method requires a much shorter time period compared to forming complicated shapes with troublesome methods such as hand lay-up or spray-up that use resins such as FRP.

Figure 3A:
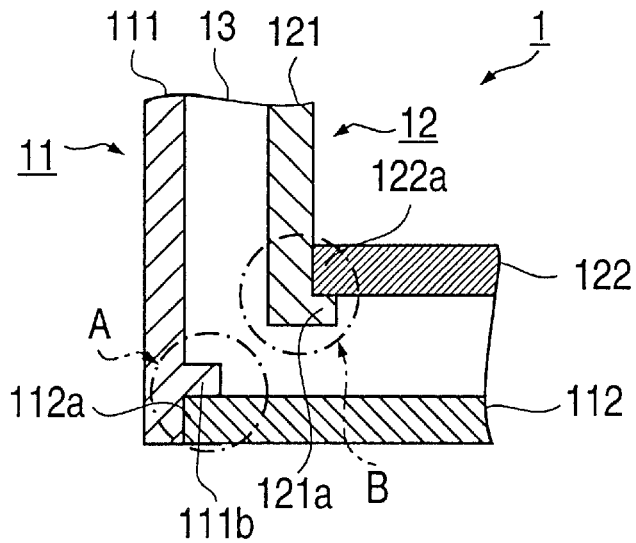
FIG. 3 shows an enlarged cross-section of each engaging portion of the cylindrical members and plate members of other embodiments of the present invention.

Further, because the non-woven cloth comprising activated carbon fibers that composes the adsorption member 5 is flexible, making it easy to put it in contact with the vacuum adiabatic portion 13 side of the inner container 12, and the adsorption member 5 is placed on the vacuum adiabatic portion 13 in contact with the vacuum adiabatic portion 13 side of the inner container 12, the ability of the adsorption member 5 to adsorb gas is improved by cooling it efficiently with the coolant 6, the degree of vacuum of the vacuum adiabatic portion 13 increases, and the ability of the container to maintain the coolant 6 improves. Also, because the activated carbon fibers are easy to cut, the adsorption member 5 can be easily formed into a shape that easily attaches to the inner container 12, and the adsorption member 5 formed into this easily attachable shape is placed on the vacuum adiabatic portion 13 in contact with the inner container, the adsorption member 5 is cooled effectively with the coolant 6 and the ability of the container to maintain the coolant 6 is further cut, the adsorption member 5 can be easily formed into a shape that easily attaches to the inner container 12, and the FIG. 3 shows enlarged cross-sections of the engaging portion of the plate member and cylindrical member of other embodiments of the present invention. In the engaging portion of FIG. 3(a) there is a ring-shaped ridge 111b around the periphery of the lower inner surface of the cylindrical member 111 of the outer container 11 and a peripheral end 112a of the disk-shaped plate member 112 abuts the lower surface of this ring-shaped ridge 111b and engages with the peripheral surface of the cylindrical member 111 as an alternate form of the engaging portion A of outer container 11. In other words, the engaging portion A is composed of the inner peripheral surface of the cylindrical member 111 and the ring-shaped ridge 111b and the peripheral end 112a. In this case the ring-shaped ridge 111b is the stopping means for supporting the plate member 112 and resisting external force.

Figure 3B:
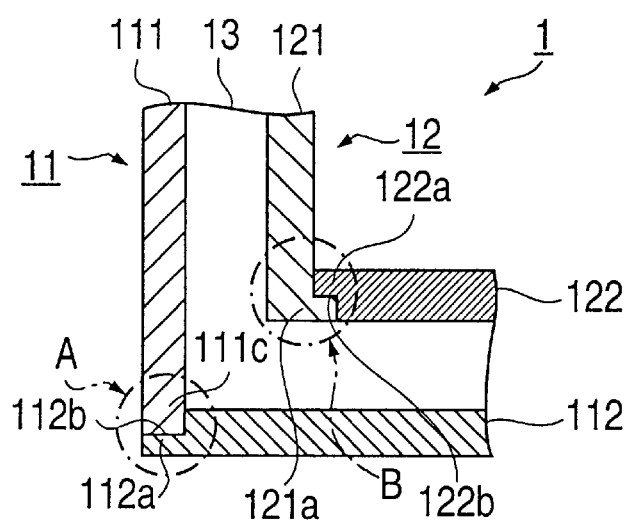

In the engaging portion shown in FIG. 3(b), a ring-shaped concavity 112b is formed in the peripheral end 112a of the plate member 112 of the outer container 11 and the ring-shaped concavity 112b of the plate member 112 engages with the peripheral end 111c of the cylindrical member 111 to join them. In other words the engaging portion A is composed of the peripheral end 111c and the ring-shaped concavity 112b. In this case the peripheral end 111c is the stopping means for supporting the plate member 112 and resisting external force.

Figure 3C:
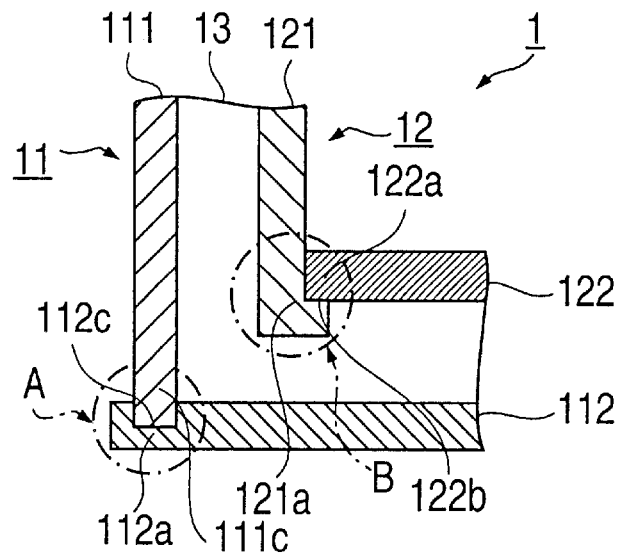

In the engaging portion shown in FIG. 3(c), a ring-shaped groove 112c is formed in the peripheral end 112a of the plate member 112 of the outer container 11 and the ring-shaped groove 112c of the plate member 112 engages with the peripheral end 111c of the cylindrical member 111 to join them. In other words the engaging portion A is composed of the peripheral end 111c and the ring-shaped groove 112c. In this case the peripheral end 111c is the stopping means for supporting the plate member 112 and resisting external force.

In the engaging portion of FIG. 3(c) there is a flange 121a around the periphery of the lower inner surface of the cylindrical member 121 of the inner container 12 and a peripheral end 122a of the disk-shaped plate member 122 abuts the upper surface of this flange 121a and engages with the peripheral surface of the cylindrical member 121 as an alternate form of the engaging portion B of the inner container 12. Here, the engaging portion B is composed of the inner peripheral surface of the cylindrical member 121 and the flange 121a and the peripheral end 122a. In this case the flange 121a is the stopping means for supporting the plate member 122 and resisting external force. The effect of engaging portion B shown in FIG. 3(a) is the same as that of the engaging portion B shown in FIG. 3(c), and the effect of engaging portion B shown in FIG. 3(b) is the same as that of the engaging portion B shown in FIG. 2.

Thus the coolant container of the present embodiment is formed by optionally assembling any of the inner containers 12 with an engaging portion B as shown in FIGS. 3(a)–(c) and any of the outer containers 11 with an engaging portion A as shown in FIGS. 3(a)–(c). In other words, one is not limited to the assemblies shown in FIGS. 3(a)–(c). It is also possible to obtain the coolant container 1 by assembling one of the outer containers 11 or one of the inner containers 12 shown in FIGS. 3(a)–(c) with an inner container 12 and an outer container 11 as shown in FIG. 2.

In each of these embodiments, external force such as atmospheric pressure acts on the plate members 112 and 122 toward the vacuum adiabatic portion 13, but due to the function of the stopping means 111b, 111c, and 121a built on each, the plate members 112 and 122 are prevented from sinking into the vacuum adiabatic portion 13 and the ability of the container to maintain the coolant 6 is maintained. A description of other functions and effects is omitted here because they are the same as those described for other embodiments above.

In the coolant container of the embodiments described above, the cylindrical members 111 and 121 are rounded-edge cylinders, but they may also be angular cylinders. In that case the plate members 112 and 122 are made into polygonal plates to correspond to this. Also, the situation in which external atmospheric forces F11 and F12 on the plate members 111 and 121 has been mentioned, but the container of the present invention is also suitable in conditions in which other external forces such as a pushing force act on the plate members in addition to atmospheric pressure. Further, the coolant container 1 is formed of FRP comprised of a raw material whose main components are epoxy resin and glass fibers, but other FRP are also suitable.

An adhesive with an unsaturated polyester resin such as epoxy resin as its main component is desirable from the standpoint of permeability of the coolant vapor. An adhesive containing a matrix resin of the container material and an organic material of the same group is also usable, or melt-deposition can be done with no adhesive at all.

A non-woven felt sheet was used as the adsorption member 5, but paper containing activated carbon fibers may also be used and a honeycomb shape rather than a sheet is also suitable. The adsorption member 5 is attached to the outer surface of the cylindrical member 121 of the inner container 12, but it may also be placed such that it is in contact with the flat surface of the vacuum adiabatic portion 13 (the hollow portion) side of the plate member 122 of the inner container 12.

The engaging portions A and B were built continuously around the periphery, but they may also be built intermittently. The function of the stopping means will be the same even if the engaging portions A and B are built in this way and will prevent the plate members 112 and 122 from sinking toward the vacuum adiabatic portion 13 (the hollow portion) side. In this case the sections where the engaging portions A and B in the peripheral end that join the plate members 121 and 122 to the cylindrical members 111 and 121 are intermitted can be sealed by filling completely with an adhesive or by melt-deposition and the vacuum adiabatic portion 13 (the hollow portion) can be made airtight.

In the manufacturing method of the coolant container of the above embodiments, the method in which the materials are formed before processing the cylindrical members 111 and 121 and the plate members 112 and 122 is not limited to the method mentioned above (manufacturing method process (1)). Other formation methods in which mass production and automation are possible are suitable and in such a case low cost processing materials can also be supplied.

As described above, with the coolant container of the present invention, the following effects are achieved. Either the inner container or the outer container or both the cylindrical member and the plate member are engaged at the peripheral end. Even if external force acts on the flat surface of the plate members, the stopping means of the engaging portions resist the external force, support the plate members, and prevent the plate members from sinking toward the hollow portion between the outer container and the inner container. As a result the container has the required structural strength and the ability of the container to maintain coolant is preserved. Moreover, because cylindrical members and plate members with simple shapes are used and there is no need to strengthen the container by screwing the plate member into the cylindrical member, materials and processing costs are reduced and a low cost product can be provided. Production is also easy because the plate members can be precisely positioned and assembled due to the function of the engaging portion.

The ability of the container to maintain coolant can be further improved by restricting the evaporation of the coolant by the hollow portion which is a vacuum adiabatic portion when maintained in a vacuum. The plate member upon which an external force of atmospheric pressure acts is prevented from sinking toward the vacuum adiabatic portion side by the stopping means and the vacuum of the vacuum adiabatic portion is not broken. It is thus possible to continue to restrict the evaporation of the coolant and improve the ability of the container to maintain the coolant.

Furthermore, because the degree of vacuum inside the vacuum adiabatic portion is raised and the deterioration of the degree of vacuum is prevented by placing an adsorption member containing activated carbon fibers in contact with the vacuum adiabatic portion side of the inner container, the ability of the container to maintain the coolant is further increased. Also, because the activated carbon fibers have a large surface area for adsorbing gases as compared with powdered or granular activated carbon and the degree of vacuum inside the vacuum adiabatic portion is increased further by increasing the adsorption ability of the adsorption member, the ability of the container to maintain the coolant can be further increased. In addition, because activated carbon fibers generate little coal dust there is no fear of polluting the environment with coal dust and the product can be provided with consideration to environmental safety.

Further, because the inner container and outer container of the coolant container are formed of low heat-transfer rate FRP and the coolant that is scattered and lost outside by transferring through the inner container can be restricted, the ability of the container to maintain a coolant is further increased. Also, because FRP is nonmagnetic and does not have an adverse magnetic effect if magnetic instrumentation is performed, for example by placing a magnetic sensor inside the coolant container, it is possible to perform magnetic instrumentation with precision.

With the manufacturing method of the coolant container of the present invention, the following effects are achieved. First, the container is easily constructed by engaging at the engaging portion formed by shaving off either the cylindrical member or the plate member or both of either the outer container or the inner container or both. Because the stopping means of these engaging portions prevent the plate member from sinking toward the hollow portion (the vacuum adiabatic portion) side, a process for strengthening the container by making a screw on the cylindrical member and the plate member and then screwing the plate member into the cylindrical member can be omitted, and the production costs are reduced. Also, simple cylindrical members and plate members that can be supplied at low cost are used and shaved with a general-purpose equipment. As a result it is possible to reduce the cost of materials and to further reduce the cost of production. Furthermore, this type of manufacturing method is simple compared to forming complicated shapes using a troublesome hand lay-up method or spray-up method using a resin such as FRP and as a result the manufacturing period is shortened.

Further, because the activated carbon fibers comprising the adsorption member are flexible and can be easily placed in contact with the hollow portion side (the vacuum adiabatic portion side) of the inner container, and the adsorption member is placed on the vacuum adiabatic portion by putting it in contact with the vacuum adiabatic portion side of the inner container, adsorption capability is increased by cooling the adsorption member efficiently with the coolant, the degree of vacuum of the vacuum adiabatic portion is increased, and the ability of the container to maintain the coolant is increased. Also, because the activated carbon fibers are easy to cut, the adsorption member can easily be formed into a shape that is easy to attach to the inner container, and the adsorption member formed in this easily attachable shape is placed on the vacuum adiabatic portion by putting it in contact with the inner container, it is possible to cool the adsorption member even more effectively with the coolant and to increase the ability of the container to maintain the coolant still more.

What is claimed is:

1. A coolant container constructed such that a hollow portion is formed by placing a cylindrical inner container with one end closed up inside a cylindrical outer container with one end closed up and joining both containers at the other ends, with coolant held inside the inner container, wherein either the outer container or the inner container or both has a cylindrical member and a plate member which engage for forming the peripheral end of the closed up end of the containers, the engaging portion of the peripheral end being formed either continuously or intermittently around the periphery, and the engaging portion includes stopping means for stopping and supporting the peripheral ends of the plate member by resisting external force acting on the flat surface of the plate member; wherein a flange is built around the entire periphery of the other end of the inner container that is supported by a support portion by the other end of the outer container, and the support portion is sealed.

2. The coolant container of claim 1, wherein the hollow portion is a vacuum adiabatic portion maintained by a vacuum.

3. The coolant container of claim 2, further comprising an adsorption member containing activated carbon fibers for maintaining adsorption of gaseous components within the vacuum adiabatic portion, said adsorption member being placed in contact with the vacuum adiabatic portion side of the inner container.

4. The coolant container of claim 2, wherein the inner container and the outer container are composed of fiber reinforced plastic and a flange is built around the entire periphery of the other end of the inner container that is supported by the other end of the outer container, and the support portion is sealed.

5. The coolant container of claim 3, wherein the inner container and the outer container are composed of fiber reinforced plastic and a flange is built around the entire periphery of the other end of the inner container that is supported by the other end of the outer container, and the support portion is sealed.

6. The coolant container as recited in claim 1 wherein the inner container and the outer container are composed of fiber reinforced plastic.

7. The coolant container as recited in claim 1 further comprising an adsorption member containing activated carbon fiber attached to a side of the inner container.

8. A coolant container constructed such that a hollow portion is formed by placing a cylindrical inner container with one end closed up inside a cylindrical outer container with one end closed up and joining both containers at the other ends, with coolant held inside the inner container, wherein either the outer container or the inner container or both has a cylindrical member and a plate member which engage for forming the peripheral end of the closed up end of the containers, the engaging portion of the peripheral end being formed either continuously or intermittently around the periphery, and the engaging portion includes stopping means for stopping and supporting the peripheral ends of the plate member by resisting external force acting on the flat surface of the plate member;

wherein the hollow portion is a vacuum adiabatic portion maintained by a vacuum; and wherein a flange is built around the entire periphery of the other end of the inner container that is supported by a support portion by the other end of the outer container, and the support portion is sealed.

9. The coolant container as recited in claim 8 further comprising an adsorption member containing activated carbon fiber attached to a side of the inner container.

10. A coolant container constructed such that a hollow portion is formed by placing a cylindrical inner container with one end closed up inside a cylindrical outer container with one end closed up and joining both containers at the other ends, with coolant held inside the inner container, wherein either the outer container or the inner container or both has a cylindrical member and a plate member which engage for forming the peripheral end of the closed up end of the containers, the engaging portion of the peripheral end being formed either continuously or intermittently around the periphery, and the engaging portion includes stopping means for stopping and supporting the peripheral ends of the plate member by resisting external force acting on the flat surface of the plate member;

wherein the hollow portion is a vacuum adiabatic portion maintained by a vacuum;

said coolant container further comprising an adsorption member containing activated carbon fibers for maintaining adsorption of gaseous components within the vacuum adiabatic portion, said adsorption member being placed in contact with the vacuum adiabatic portion side of the inner container; and wherein a flange is built around the entire periphery of the other end of the inner container that is supported by a support portion by the other end of the outer container, and the support portion is sealed.

* * * * *